…

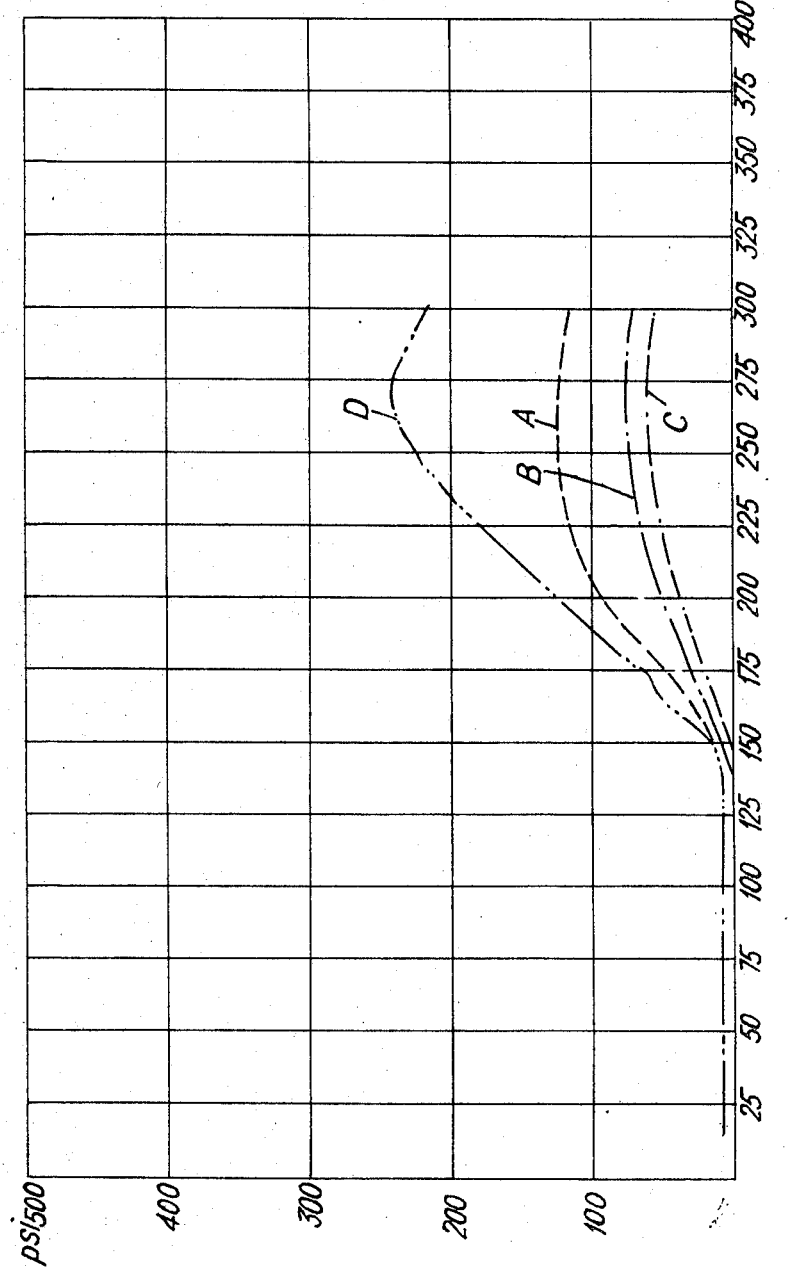

United States Patent Office 3,551,540
Patented Dec. 29, 1970

3,551,540
PROCESS FOR THE CONTINUOUS PRODUCTION OF UNIAXIALLY AND BIAXIALLY ORIENTED FILMS
Giorgio Lodovico Pellicciari and Ugo Lodovico Frisinghelli, Milan, Italy, assignors to W. R. Grace & Co., Duncan, S.C., a corporation of Connecticut
Filed Nov. 24, 1967, Ser. No. 685,435
Claims priority, application Great Britain, Nov. 30, 1966, 53,704/66
Int. Cl. B29c 17/02, 17/07, 25/00
U.S. Cl. 264—89        5 Claims

ABSTRACT OF THE DISCLOSURE

The invention provides a novel process for the production of oriented films useful for example in packaging. In the process a tubular film is first prevailingly transversely oriented by the bubble technique and is then longitudinally oriented by stretching. Films having particularly valuable shrinkage characteristics can be obtained.

---

Figure 1:
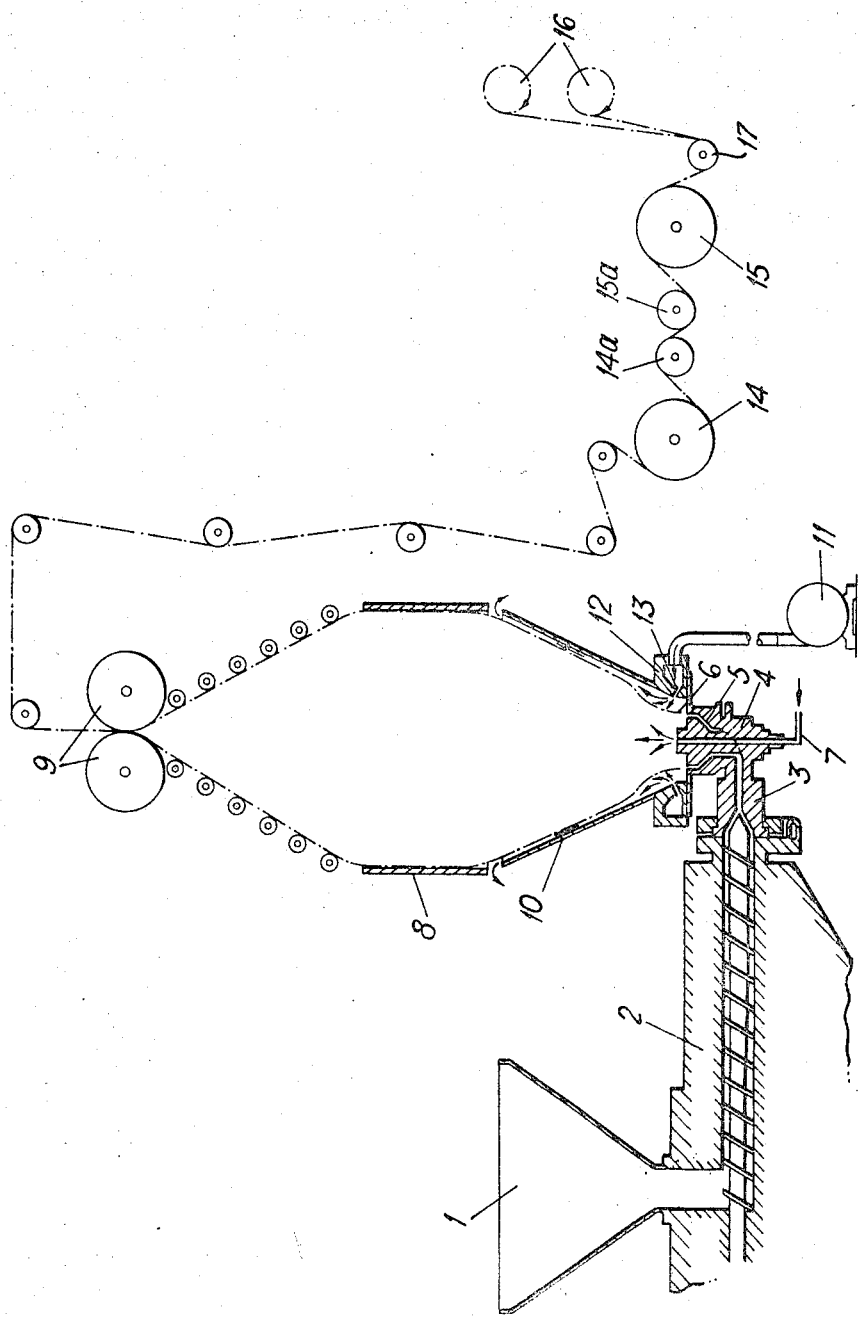

This invention relates to the production of oriented films.

It is known to produce biaxially oriented films by expansion of a tubular film by the one-step or two-step bubble process, in both of which processes the film is oriented simultaneously in two directions.

In the one-step bubble process the tubular extrudate is expanded to a predetermined diameter immediately after extrusion and is pulled off at a predetermined speed which is greater than the speed of extrusion. In this process control of the shrinkage properties of the film is difficult, and in any case the attainable shrink values in both directions are very limited; thus for a rigid polyvinyl chloride (PVC) film the maximum shrink value is about 20% in each direction at 100° C., whilst for many applications considerably higher values are desirable; plasticised PVC films made by this method have slightly higher shrink values, which are, however, still insufficient. Another disadvantage of this process is that it is difficult to obtain regular wrinkle-free film.

The methods by which the shrink values and shrink tensions referred to in this specification are measured are described in detail later in this specification.

In the two-step bubble process the tubular extrudate is cooled to room temperature directly after extrusion without achieving substantial orientation, and is then reheated and expanded by the bubble method. The bubble is only stable under restricted temperature and stretching conditions, so that it is not possible to produce oriented films having a wide range of shrinkage properties. In the case of non-plasticised PVC film, for example, only films with high shrink tension values, which are unsuitable for most packaging applications, can be obtained. By this process too, it is difficult to obtain regular wrinkle-free film. A further shortcoming of this process is that only restricted widths of film can be produced, due to the limited range of stretching ratios that can be employed. Attempts to produce wider films by expanding the film in the first bubble directly after extrusion result in films having poor thickness uniformity, which films are unsuitable for many applications.

Biaxial orientation of flat films can be achieved only by tenter frame processes, which are difficult to operate satisfactorily if films having a wide range of shrinkage properties are to be prepared and are expensive in terms of yield losses and equipment.

It has now been discovered that a very satisfactory method of producing an oriented film of an organic polymer comprises:

(a) Melt-extruding the polymer through an annular die to form a tubular film of the polymer;

(b) Expanding the tubular film by means of internal gaseous pressure at a temperature between the melt temperature and the solidification temperature (i.e. the temperature at which the oriented film is dimensionally stable if no external forces are exerted to change the dimensions of the film) under conditions such that the film is prevailingly oriented in the transverse direction;

(c) Cooling the oriented film to below the solidification temperature; and (d) Reheating and longitudinally orienting the film at a temperature above the solidification temperature.

The longitudinal orientation step (d) can be carried out on the transversely oriented tubular film as such, or the tubular film can be slit, usually into two flat films by edge trimming, and the flat films longitudinally oriented. The longitudinal orientation can be carried out as a continuous process with the transverse orientation, or the transversely oriented film can be passed to a wind-up station and longitudinally oriented in a separate step.

This novel process has the outstanding advantage that by appropriate variation of the stretch ratios and temperatures in the orientation steps, films having a wide range of shrink characteristics can be prepared. In addition the thickness uniformity of the oriented films is extremely good and the films are regular and wrinkle-free.

The ability of the novel process to produce films having a wide range of shrinkage characteristics is particularly valuable for films to be used for packaging. For such films it is often desirable to have a film with high shrink values but low shrink tensions. Such films can readily be produced by the novel process, but not easily by the known processes. The single step bubble process results in films with low shrink tensions, but with very limited shrink in both directions. The two step bubble process and the tenter frame operations on the other hand give films with substantially higher degrees of biaxial shrink; this property is, however, always combined with a relatively high shrink force, if the films are not annealed in a separate process step.

Low values of shrink tension are especially desirable when articles which are easily deformable have to be packed. In addition low shrink tensions facilitate heat sealing prior to shrinking the film and are therefore of great advantage, particularly in the case of rigid films with a high modulus, such as non-plasticised PVC, and polystyrene, which can only be heat sealed at temperatures above the temperature where substantial shrink occurs. When preparing oriented PVC films by the novel process, shrink values of up to 60% in both directions can be obtained, but the shrink tensions can be much lower than in films having comparable shrink values prepared by the previously known tenter frame and two-step bubble processes; thus the shrink tension can be adjusted to a predetermined level and in some cases can be reduced to 100 p.s.i. (7 kg./cm.$^2$) or even lower. Not only can the shrink tension and shrink value be varied independently, but also films can be made whose shrink properties are non-balanced. A film with such a shrink behaviour is advantageous if rectangular items are to be packed. When using films whose shrink tensions are balanced at any level, shrink wrapping of these rectangularly shaped objects results in the formation of so-called "dog ears." "Dog ears" are erected, non-collapsed corners of the shrink package after having passed the shrink tunnel, which have a very poor appearance. When using non-balanced films as described above, these "dog ears" can be eliminated. For example it is easy to produce a biaxially oriented PVC film which has 40% shrink in both directions at 100° C. with a transverse shrink tension maximum of 100 p.s.i. (7 kg./cm.$^2$) and a shrink tension in the longitudinal direction of 250 p.s.i. (17.5 kg./cm.$^2$) and more. The process can of course also provide highly shrinkable films with medium to high shrink tensions in both directions. Such films are especially desirable if optimum mechanical properties in both directions are required.

Thermoplastic polymers which can be used in the process of the invention include all film forming resins which can be oriented in the softened or molten state, i.e. above the glass transition temperature in the case of amorphous polymers, and in the case of polymers with a certain degree of crystallinity above the temperature where substantial crystallization takes place when these polymers are cooled down from the temperature used for extrusion. Amorphous polymers which can be advantageously employed comprise homo and copolymers of vinylchloride and styrene. When crystalline polymers are employed, they preferably do not have a sharp crystalline melting point but change gradually from a solid to a viscous liquid over a range of temperature. Examples are polyethylene and polypropylene, especially if their melting range is broadened by means of a suitable copolymerisation or by addition of another polymeric material of less or no crystallinity.

Specific amorphous polymers which can be used include as a preferred group the vinyl chloride polymers, this term being used to include homopolymers of vinylchloride, which are particularly suitable, copolymers of vinylchloride and vinyl acetate, copolymers of vinylchloride and vinylidene chloride, copolymers of vinylchloride and styrene, copolymers of vinylchloride and acrylonitrile, copolymers of vinylchloride and dialkyl fumarate or maleate, copolymers of vinylchloride and alkyl methacrylate or alkyl acrylate, copolymers of vinylchloride, methyl methacrylate and vinylacetate and copolymers of vinyl chloride and propylene; and blends of polyvinylchloride with one or two of the copolymers mentioned, blends of polyvinylchloride with chlorinated polyethylene, of polyvinylchloride with ABS-terpolymers and of polyvinylchloride with an acrylate or methacrylate polymer. The polymers can also contain plasticisers up to 35% by weight, e.g. 5 to 35% by weight. All commercial plasticizers, especially those of the ester type, are recommended. Other amorphous polymers are polystyrene, poly alpha-methyl styrene, copolymers of at least 50% by weight of styrene with ethylenically unsaturated comonomers such as acrylonitrile, methacrylonitrile, alkyl methacrylate and/or a conjugated diolefin with 4 to 6 carbon atoms such as butadiene-1,3. Crystalline polymers which are melt orientable include polyethylene, polypropylene, polybutene-1, copolymers of ethylene and propylene, of ethylene and butene, of propylene and butene, of ethylene and vinyl acetate, of ethylene and alkyl acrylate and alkyl methacrylate, and the so-called ionomers. Also polyblends of these polymers among each other and with other polymeric substances, especially those which broaden the melting range, are suitable.

In the first orientation step the tubular film is oriented prevailingly in the transverse direction by internal gaseous pressure at a tempearture between the melt temperature and the solidification temperature, to which temperature the tubular extrudate is cooled by appropriate cooling means. The expanded tube is collapsed and drawn off by a pair of pinch rolls at a rate which is normally higher than the rate of extrusion. Generally the speed of the pinch rolls is adjusted to such a value that the longitudinal draw down ratio lies between 5:1 and 20:1. The transverse expansion or blow up ratio is normally between 2:1 and 4:1. It has surprisingly been found that in the process according to the invention this high longitudinal stretching of the film is not accompanied by longitudinal orientation. In fact in order to obtain a film which, at the end of the first orientation step, is prevailingly oriented in the transverse direction (and has therefore little or no longitudinal shrink), cooling of the tube should not be efficient immediately after the melt exits from the die. The phenomenon is most probably due to the sequence of the thinning actions between the points where the melt leaves the die and where the bubble is completely formed. The main part of the longitudinal thinning of the melt apparently happens immediately after the melt has left the die, i.e. in a zone where the bubble is not yet being expanded. Thus the longitudinal thinning occurs at a higher temperature than the bubble expansion. At this high temperature, which is close to the melt temperature in the die, the relaxation rates are high enough to avoid substantial longitudinal orientation. Due to the appropriate cooling means which are applied to the tube leaving the die the transverse expansion of the bubble occurs in a temperature range which is lower than the melt temperature at which the major part of the longitudinal thinning takes place, thus imparting to the film molecular orientation prevailingly in the transverse direction as the relaxation times at these temperatures are considerably longer. The expansion of the bubble actually does not take place at a fixed temperature, i.e. not isothermally, but in a temperature gradient. This also gives a possible explanation of the excellent thickness uniformity of the films obtained by the process of the invention. The thinner portions of the bubble which is being expanded are more rapidly cooled than the thicker ones and therefore have more resistance to further stretching than the thicker zones and the film consequently tends to uniformise with respect to thickness distribution. The transverse shrink of the film after the first step of the biaxial orientation process of the invention can be as high as 60% measured at 100° C. The longitudinal shrink is very much lower. Thus it is preferred that at the end of the transverse orientation step the longitudinal orientation of the film should be such that the longitudinal shrink of the film is below 10%, at 100° C.

The transverse shrink properties depend on the expansion ratio of the bubble and the intensity of cooling. The expansion of the bubble, i.e. the ratio between final bubble diameter and diameter of the die should generally be at least 2:1, e.g. 2:1 to 4:1, preferably 2.5:1 to 3.5:1. It has also surprisingly been found that the transverse shrink properties of the film also depend on the shape of the bubble in which the stretching takes place. In particular, the more rapid the stretching at a given temperature, the higher the shrink tension of the oriented film. Thus in one embodiment of the invention the shape of the bubble in the transverse orientation step is controlled during at least part, and preferably substantially all, of the time during which transverse orientation takes place. [By saying that the shape is "controlled" we mean that the film is forced to follow a path different from that which it would follow if atmospheric pressure only acted on the exterior of the bubble.] The shape can conveniently be controlled by means of a divergent generally frusto-conical guide, particularly one on whose inner wall is maintained a layer of gas or other fluid; such a layer can be produced by means of fluid introduced at the bottom of the guide (e.g. fluid used to cool the extrudate) or by means of fluid introduced through the walls of the guide, or by a combination of such means. The temperature of the film can of course be controlled by the layer of fluid. The angle of the cone of the guide may be for example 40° to 70°, preferably about 50°.

The film, after it has been prevailingly transversely oriented, is cooled down to a temperature below its solidification temperature. It is then reheated and exposed to the second process step, the longitudinal orientation. This longitudinal orientation step is carried out between two sets of nip rollers with different circumferential speeds. The speed difference determines the longitudinal stretching ratio and thus the longitudinal shrink. The stretching ratio should be at least 1.2:1 and can be as high as 5:1 depending on the type of polymer used and on the amount of shrink desired. In the case of PVC a stretch ratio of 1.2:1 to 2.5:1 is usually employed. The temperature of the film during longitudinal orientation should be above the glass transition temperature in the case of the amorphous polymers. If crystalline polymers are being used in the process the temperature should be above a value of the final crystalline melting point minus 40° C. The longitudinal orientation is preferably carried out in such a manner that none or only a very little of the transverse shrink which has been imparted to the film in the first process step is lost; this may be achieved by stretching over a very restricted length, preferably below 2 cm., particularly below 1 cm. in order to keep width reduction to a minimum.

It is a surprising advantage of the process of the invention that this second orientation step can be carried out over a relatively wide temperature range. This is especially important in the case of amorphous polymers, such as polyvinylchloride. In the hitherto known processes for biaxial orientation of polyvinylchloride films it was only possible to achieve reasonably high biaxial stretching ratios at tempertaures slightly above the second order transition point of rigid polyvinyl chloride (PVC) (90 to 110° C.) or at temperatures close to the temperature at which the melt has to be extruded (160 to 200° C.). At intermediate temperatures, i.e., 110 to 160° C., stretching ratios were very limited, thus resulting in films of extremely low shrink. In the process of the invention, however, stretching ratios of 2:1 and more can be obtained when longitudinally orienting the prevailing transversely oriented PVC film at these intermediate temperatures. This high stretchability at intermediate temperature has two important advantages. Firstly high shrink values can be reached in the longitudinal direction. As the prevailingly transverse orientation of the first process step can also easily be kept at high levels, biaxially shrinkable film with shrink values of up to 60% at 100° C. can be prepared. On the other hand the values of shrink tension can be "tailor-made" and can for example be reduced to levels of 100 p.s.i. (7 kg./cm.$^2$) or even less in both directions. Normally the higher the temperature of orientation, the lower the shrink tension. This phenomenon is most probably due to an annealing of the transversely oriented film, which becomes more effective with higher temperatures and/or higher residence times at these temperatures. Stretching at intermediate temperature thus substantially reduces the shrink tension without losing the desired high degrees of shrinkability. A film which is oriented at too high a temperature close to the temperature of melt extrusion has shrink values which are too low for many applications.

When the films are composed of material having a glass transition temperature close to room temperature (e.g. plasticised vinyl chloride polymer films in which the content of plasticiser is greater than 15%, particularly 20%, by weight), they tend to shrink on storage, which causes distortion of rolls of the film. This problem can be substantially overcome by subjecting the biaxially oriented film to a pre-shrinking treatment. In this treatment the film is allowed to shrink by 2 to 35% in both directions at a temperature of 40° to 90° C. In its simplest form the treatment involves heating the film as it passes between two sets of nip rolls with an overfeed corresponding to the desired amount of longitudinal pre-shrinkage and with the distance between the nip rolls and the length of the heating zone being adjusted to give the desired amount of transverse shrinkage.

The invention includes also apparatus adapted for carrying out the novel process which apparatus comprises in combination:

(a) An annular extrusion orifice;

(b) Extrusion means for supplying molten polymer to the orifice and for extruding molten polymer through the orifice;

(c) A set of nip rolls for drawing a polymeric tubular film from the orifice and for collapsing said tubular film to form a substantially gas-tight bubble of extruded polymer;

(d) Gas supply means for supplying gas at controlled superatmospheric pressure to the interior of said gas-tight bubble; and (e) Cooling means for supplying cooling gas which impinges on the exterior of the tubular film close to the orifice and defines a zone adjacent to the orifice in which the tubular film is longitudinally stretched without substantial longitudinal orientation.

The invention is illustrated in the accompanying drawings in which the figure is a cross-section of apparatus for carrying out the novel process.

Referring to the figure, a polyvinylchloride containing blend is fed through hopper 1 into a conventional extruder 2 wherein it is heated to an appropriate temperature. As the thermoplastic material is fed through the extruder by a screw, rotated by known means, it is melted. The extruder is provided with a suitable heating means. The molten polymer is fed to an adaptor 3 bolted to the head of the extruder. A die 4 is secured in any appropriate manner to the outlet of the elbow and the molten polymer passes thereinto. The die is provided with an annular orifice 5 from which the viscous thermoplastic mass emerges in the form of tubing 6. The die is also provided with a central orifice 7 which is connected to an air supply whereby the tubing is inflated by introducing air into the interior thereof in sufficient quantity to give the desired diameter. The air supply is provided with a valve, not shown, so that when the desired quantity of air has been introduced within the tubing, further supply thereof can be prevented. In the event the quantity of the air decreases, as for example by leakage or otherwise, the requisite quantity of air can be added by proper manipulation of the valve. The inflating tubing is drawn upwardly and interiorly through a cooling ring 8 by a pair of rotating squeeze rolls 9 which also serve to completely collapse the tubing and retain the inert gaseous medium, e.g. air, at the point described. The tubing 6 is cooled down below the temperature of extrusion to a temperature which is suitable for orientation and is stretched by inflation to transversally orient it, the tube being cooled down to said temperature by a controlled circumferential substantially vertical upward air current which is enclosed between said expanding bubble and properly designed frusto-conical guide 10.

Cooling air is supplied from a fan 11 to the cooling ring 12 from both ends thereof and it passes therefrom through the gap 13 onto the exterior surface of the tubing. This gap is adjusted in such a manner that the cooling air impinges against the tube slightly above the point where it leaves the die. The stream of cooling air constitutes a cooling zone serving to chill or set the expanding plastic tube to the desired diameter. The stream of air is then conveyed upwards along the inner surface of the guide 10. Thus the film which is being stretched is cooled by means of this stream of air. The air supplied at the lower end of the housing by means of the air cooling ring may be supplied at different temperatures according to the desired degree of transversal orientation which has to be given to the film. The air cooling means are not shown in the figure.

After passing through the pinch rolls, the tubing is passed over suitable guide rolls and either wound up on wind-up rolls for subsequent separate orientation on the longitudinal machine, or can be directly fed to said machine as shown in the figure. The longitudinal machine consists of a series of rolls arranged in side-by-side relation, wherein the web of material to be stretched is threaded under and over rolls alternately to follow a sinuous path through the machine. Means are provided for driving one part of the machine, the draw rolls 15, at a surface speed greater than the speed of the other part, the feed rolls 14, so that a predetermined degree of the stretching is thus obtained. During its passage through the machine, the film to be stretched is heated to a proper temperature by means of the feed rolls; the stretch ratio of the plastic film is provided for by the difference in linear speeds between the feed rolls and the draw rolls and the stretch rate is determined by the linear distance between the two points of tangency on the adjacent feed roll 14a and draw roll 15a of the two separate pairs of rolls. The linear distance is variable through the adjustment feature of pivoting the draw rolls toward and away from the feed rolls. This stretching gap is preferably kept at a value of less than 10 mm. The film produced as shown in the figure is longitudinally oriented as a laid flat tubing and in this particular case is edge trimmed, separated and wound up on two wind up stations 16. As has been stated above, the flat tubing can also be wound up after having left the pair of pinch rolls 9, either as such or on two unwind stations as a single film after edge trimming and separation. The subsequent longitudinal orientation step is then carried out as a separate process step and the orientation unit has to be equipped with a suitable unwind station. If the laid flat tubing is directly longitudinally oriented as shown in the figure, it can be advantageous for economic and practical reasons to carry out this orientation step under such temperature conditions that the two layers completely fuse together to result in a homogeneous film of twice the wall thickness of the tubing.

The invention is further illustrated by the following examples which are summarised in the following table giving the process conditions and results of a series of runs in which polyvinylchloride-containing films were oriented by the process described above using apparatus as shown in the figure.

The raw material used in all the examples was a nonplasticised homopolymer of polyvinylchloride (PVC) having a K-value of 60. The PVC contained 1.5% by weight of a commercial sulphur containing di-alkyl tin compound as stabiliser and 2.5% by weight of a mixture of commercial lubricants. The die temperature in each example was 200° C.

EXAMPLES 1-4

The blow ratio (final bubble diameter divided by diameter of tube when exiting from the die) was 2.5–2.9:1. The cooling air had a temperature of 15° C. when entering into the cooling ring. The amount of cooling air was 400 cu.m./hr. Longitudinal stretching ratios were 1.6–1.5:1 and the temperature of longitudinal orientation was varied from 110 to 170° C.

EXAMPLES 5-7

In these examples the PVC contained 15% of di-octyl phthalate as plasticiser. The amount of stabiliser and lubricants was reduced with respect to the previous examples. Blow ratios were 3.4–3.9:1. The air temperature for bubbles cooling was kept at 9° C., measured in the entrance of the cooling ring. An air refrigerator unit was used for this purpose. The amount of air was the same as in the previous examples. Longitudinal stretching ratios were 1.4:1 at 150 to 160° C.

EXAMPLES 8-10

In these examples the PVC contained 20% by weight of di-octyl phthalate as plasticiser. Extrusion temperature was 190° C. Temperature and amount of cooling air was the same as in Examples 5–7. Blow ratio was 3.4:1. Longitudinal stretching ratios were 1.4–1.7:1 at temperatures between 110 and 130° C.

EXAMPLES 11-13

In these examples the PVC contained 26.5% by weight of an epoxidised soya bean oil as plasticiser/stabilizer. Die temperatures were again 190° C. Blow ratios were adjusted to 2.5 and 3.5:1. Temperature and amount of cooling air were the same as in the previous examples. Longitudinal stretching ratios were adjusted to 1.7–2.1:1. Longitudinal orientation temperatures were varied from 70 to 110° C.

TABLE

The values for free shrink were measured in the following way. A square sample of 10 x 10 cm. was cut from the film and immersed in a bath of mineral oil kept at 100° C. and 120° C. respectively. The immersion time was 4 seconds. The film was then dipped into a cold water bath. The change in the dimensions was measured and expressed in % of the original dimensions. Maximum shrink tensions were determined in the following way. A film sample (10 cm. long and 1.27 cm. wide) was fixed to an upper clamp and attached to a force sensing device capable of transforming mechanical forces into electrical tension. A thermocouple was fixed adjacent to the film. The film was then heated in a current of air whose temperature increased from room temperature to 150° C. in about 60 seconds. The electrical signals resulting from the force transducer and the thermocouple were fed into an XY-recorder and the curve of shrink force versus temperature was plotted. The shrink force was transformed into shrink tension by dividing it by the cross section of the sample. The maximum of the shrink tension is reported in the table, independent from its temperature position.

All films prepared under the conditions given above were regularly oriented and wrinkle free. The thickness uniformity was excellent. Thus the gauge variations of the film prepared according to example was between 12.7 and 15.2µ which represents an extremely good uniformity for a biaxially oriented film. The values for shrink and shrink tension quoted in the table show that they can be tailor-made adjusting the important process parameters. Shrink values range from 10 to 53% and shrink tensions as low as 60 p.s.i. (4.2 kg./cm.$^2$) are attainable. The films can be practically balanced with respect to shrink and shrink tension (see Examples 2, 6, 7); they can also have a relatively high degree of non-balanced shrink characteristics (Examples 10, 12, 13).

| | Plasticizer, percent | Die temperature (° C.) | Blow ratio | Free transverse shrink percent at 100° C. | Longitudinal stretching ratio | Longitudinal stretching temperature (° C.) | Nominal film thickness, µ | Free shrink values at 100° C. | | Shrink tension value, maximum | |
|---|---|---|---|---|---|---|---|---|---|---|---|
| | | | | | | | | L percent | T percent | L(p.s.i.) (kg./cm.$^2$) | T (p.s.i.) (kg./cm.$^2$) |
| Example No.: | | | | | | | | | | | |
| 1 | 0 | 200 | 2.5:1 | 25 | 1.6:1 | 110 | 20 | 30 | 19 | | |
| 2 | 0 | 200 | 2.9:1 | 30 | 1.5:1 | 130 | 20 | 20 | 19 | 219 (15.3) | 230 (16.8) |
| 3 | 0 | 200 | 2.9:1 | 30 | 1.5:1 | 150 | 20 | 20 | 17 | 179 (12.5) | 200 (14.0) |
| 4 | 0 | 200 | 2.9:1 | 30 | 1.5:1 | 170 | 20 | 17 | 10 | 158 (11.1) | 110 (7.7) |
| 5 | 15 | 195 | 3.4:1 | 38 | 1.4:1 | 150 | 20 | 22 | 17 | 95 (6.7) | 95 (6.7) |
| 6 | 15 | 195 | 3.9:1 | 48 | 1.4:1 | 150 | 20 | 23 | 23 | 140 (9.8) | 110 (7.7) |
| 7 | 15 | 195 | 3.9:1 | 48 | 1.4:1 | 160 | 20 | 23 | 22 | 110 (7.7) | 90 (6.3) |
| 8 | 20 | 190 | 3.4:1 | 42 | 1.4:1 | 110 | 18 | 28 | 30 | 245 (17.2) | 135 (9.5) |
| 9 | 20 | 190 | 3.4:1 | 42 | 1.4:1 | 130 | 18 | 29 | 18 | 205 (14.4) | 60 (4.2) |
| 10 | 20 | 190 | 3.4:1 | 42 | 1.7:1 | 120 | 18 | 43 | 28 | 450 (31.5) | 130 (9.1) |
| | | | | | | | | At 20° C. | | | |
| 11 | 26.5 | 190 | 2.5:1 | 24 | 1.8:1 | 70 | 13 | 26 | 20 | | |
| 12 | 26.5 | 190 | 3.5:1 | 44 | 2.1:1 | 115 | 13 | 53 | 33 | 500 (35.0) | 100 (7.0) |
| 13 | 26.5 | 190 | 3.5:1 | 44 | 1.7:1 | 110 | 13 | 45 | 39 | 250 (17.5) | 130 (9.1) |

At the end of the transverse orientation step, and before the longitudinal stretching step, the transverse shrink tension of the film should preferably be at least twice, especially more than 10 times, the longitudinal shrink tension, which would make the longitudinal free shrink relatively inconsequential. Most preferably, the longitudinal free shrink should be substantially zero. At the same time the transverse shrink tension will usually be from about 200–900 p.s.i. (14–56 kg./cm.²) more usually about 350–800 p.s.i. (24.5–56 kg./cm.2), especially about 400 p.s.i. (28 kg./cm.²). Shrink tension in the longitudinal direction will at this time usually be less than 100 p.s.i. (7 kg./cm.²) and more usually substantially less than 80 p.s.i. (5.6 kg./cm.²).

When a plasticised polymer, particularly plasticised PVC, is used, the plasticiser serves the dual function of making material more easily extrudable by lowering the viscosity of the material and thereby the processing temperature and it also may be one important factor in providing the characteristic in the final shrunken film of the film's memory or ability to return to taut condition when it is temporarily deformed from a taut condition by, for example, being deformed by an object pressing against the film. This is the type of treatment the film is subjected to when used on packages in stores where customers handle the product. A preferably plasticiser content for this purpose is 15–25%, more preferably about 20%.

The film produced by the process of this invention in one preferred form thereof has from 15 to 25% preferably 20% plasticiser based on 20 parts of plasticiser per 100 parts of PVC resin; from .2 to .8 preferably .4 parts of wax based on 100 parts of PVC resins; .000001 to .0005, preferably .00001 part of tinting agent per 100 parts of PVC resin, sufficient tinting agent of a violet hue to give a silver gray cast or mask to the usually light brown straw coloured PVC film; and 1 to 2 parts preferably about 1 part of stabiliser per 100 parts of PVC resin. The wax not only serves as a lubricant during extrusion but also as a slip agent during subsequent handling of the film. The transverse free shrink of the film in one preferred form thereof is between about 15 to 33% at 212° F. (100° C.) and between about 25 and 41% at 250° F. (121° C.) with a maximum of less than 50%. In the longitudinal direction the free shrink is between about 25 and 40% at 212° F. (100° C.) and between about 30 and 45% at 250° F. (121° C.). The transverse shrink tension is between about 40 and 120 p.s.i. at 212° F. (2.8–8.4 kg./cm.² at 100° C.) and between about 50 and 135 p.s.i. at 250° F. (3.5–9.45 kg./cm.²) with a maximum of less than 200 p.s.i. (14 kg./cm.²). In the longitudinal direction, the shrink tension is about 100 to 210 p.s.i. at 212° F. (7–14.7 kg./cm.² at 100° C.) and between about 120 and 210 p.s.i. at 250° F. (8.4–14.7 kg./cm.² at 121° C.) with a maximum of less than 300 p.s.i. (21 kg./cm.²). In a more preferred embodiment of one preferred form of the film the transverse shrink is less than about 2% at 135° F. (57° C.) and between about 15 and 20% at 212° F. (100° C.) and about 28 and 33% at 250° F. (121° C.) with a maximum of less than 40%. The free shrink in the longitudinal direction is less than about 2% at 135° F. (57° C.) and between 25 and about 30% at 212° F. (100° C.) and about 30 and 37% at 250° F. (121° C.) with a maximum of less than 45%. The transverse shrink tension is less than about 5 p.s.i. at 135° F. (0.35 kg./cm.² at 57° C.) and between about 40 and 60 p.s.i. at 212° F. (2.8–4.2 kg./cm.² at 100° C.) and between about 50 and 70 p.s.i. at 250° F. (3.5–4.9 kg./cm.² at 121° C.) with a maximum of 80 p.s.i. (5.6 kg./cm.²). The longitudinal shrink tension is less than 5 p.s.i. at 135° F. (0.35 kg./cm.² at 57° C.) and between about 130 and 160 at 212° F. (9.1–11.2 kg./cm.² at 100° C.) and between about 140 and 170 p.s.i. at 250° F. (9.8–11.9 kg./cm.² at 121° C.) with a maximum of 170 p.s.i. (11.9 kg./cm.²).

In the apparatus of the invention which includes a generally frusto-conical guide, the guide not only serves to shape the bubble during orientation and thereby provide the rate of orientation, but it also serves to hold the cooling air next to the bubble so that it continuously cools the bubble as the bubble is drawn upwardly over a distance. Thus the cone serves as a heat exchanger orientation chamber. The air is, of course, continuously heated by the film as it rises through the funnel. The air also serves as a cushion to keep the bubble from scraping against the sides of the funnel.

In the apparatus described above it is in certain instances desirable to mount the bubble draw rolls 9 and various converging assembly rolls that feed the bubble into the draw rolls 9 and all parts of the apparatus downstream of the draw rolls 9 on a rotating platform much like a merry-go-round and rotate them relative to the die 4 at about ¼ r.p.m. to produce a more even roll profile in the finished product by distributing possible gauge variations to thereby produce a flat even roll. This improves the subsequent machining characteristics of the film in many instances during subsequent processing of the film into bags or other products.

The following examples further illustrate the invention.

EXAMPLE 14

The procedure of Example 8 was repeated except the longitudinal stretching ratio was 1.65:1 and the longitudinal stretching temperature was 125° C. Also .00001 part of:

(1) Calco oil violet manufactured by: Calco Chemicals Division, American Cyanamid, Boundbrook, N.J. Identified as Calco oil violet ZIRS. Reference: The colour index of the Society of Dyes and Colorists, vol. 2, page 2870.

CI Solvent violet 13(60725)

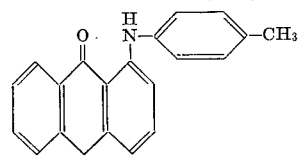

A derivative of anthraquinine and p-toluidine, violet tinting agent was used per 100 parts of PVC resin. The stabiliser used was: (a) Organo Tin Stabiliser manufactured by: Advanced Division, Carlisle Chemical Works, New Brunswick, N.J., Advastab T 17 Mo, a mixture of di-n-octyl tin bis (2 ethyl-n hexyl thioglycolate), and epoxidised soybean oil, an organic tin complex stabiliser, was used in the amount of 1.4 parts based on 100 parts of PVC resin and .4 part of (3) Advawax 240—a hard fatty amide wax, manufactured by: Advance Division, Carlisle Chemical Works, New Brunswick, N.J. was used per 100 parts of PVC resin. The mixture was added to the hopper 1. In addition the roll 15 of the apparatus was heated and maintained at 140° F. (60° C.) and the cool roll 17 was maintained at a temperature of about 50° F. (10° C.) to provide a pre-shrinking treatment to the film to stabilise it against the occurrence of undesirable shrinking during storage or transportation. Roll 17 was operated at a slightly reduced rate 5 to 10% slower than the roller 15 so as to allow for the desired pre-shrink.

Two runs were made under these conditions.

EXAMPLE 15

A procedure of Example 14 was repeated expect roll 15 was not heated and roll 17 was not cooled.

FIGS. 2–5 of the accompanying drawing show the characteristics of the films produced in Example 14 (lines B and C) and Example 15 (line A) and, for comparison purposes, a commercially available PVC film (identified as 5155 PVC of Reynolds Plastics Division of Reynolds Aluminium, purchased in 1967) (line D).

Figure 2:
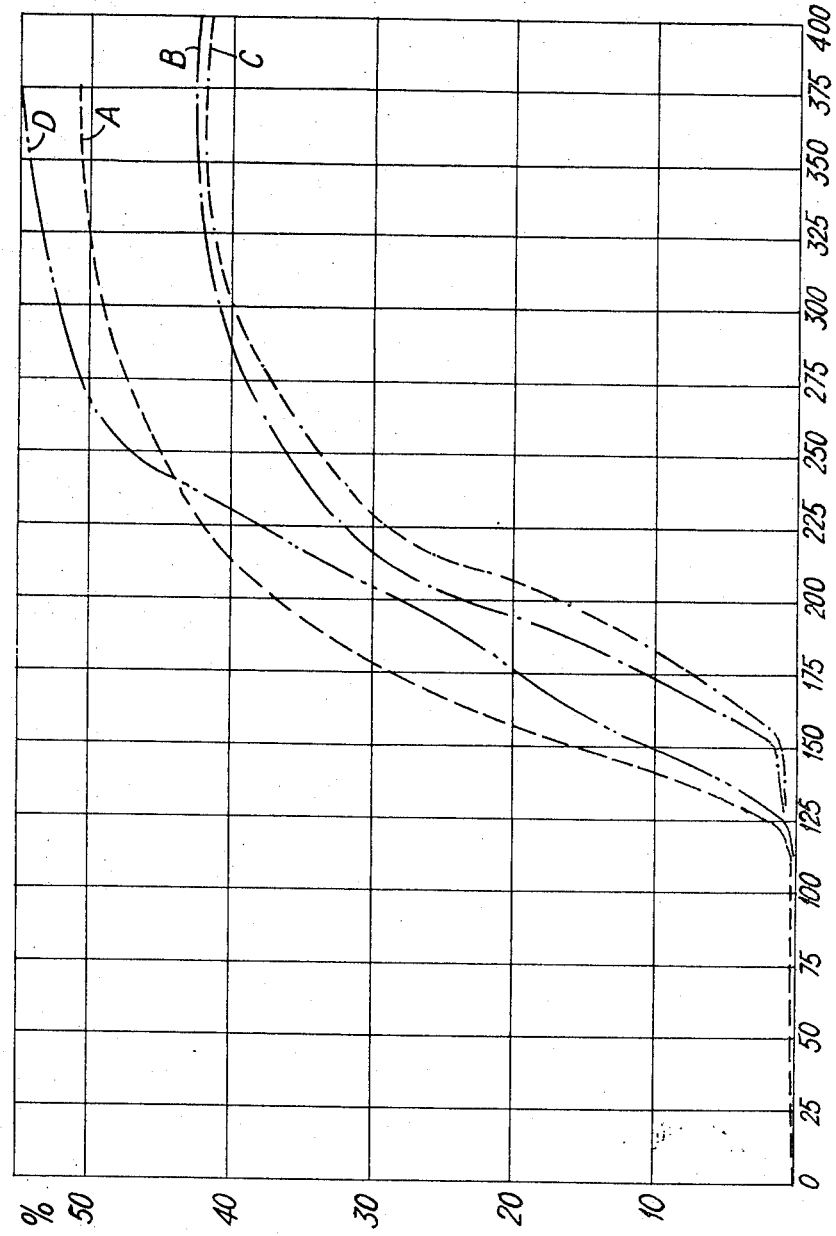

In each of FIGS. 2–5 the temperature is given in °F. on the horizontal axis. The vertical axis shows:

In FIG. 2 the free shrink in the longitudinal direction (percent).

Figure 3:
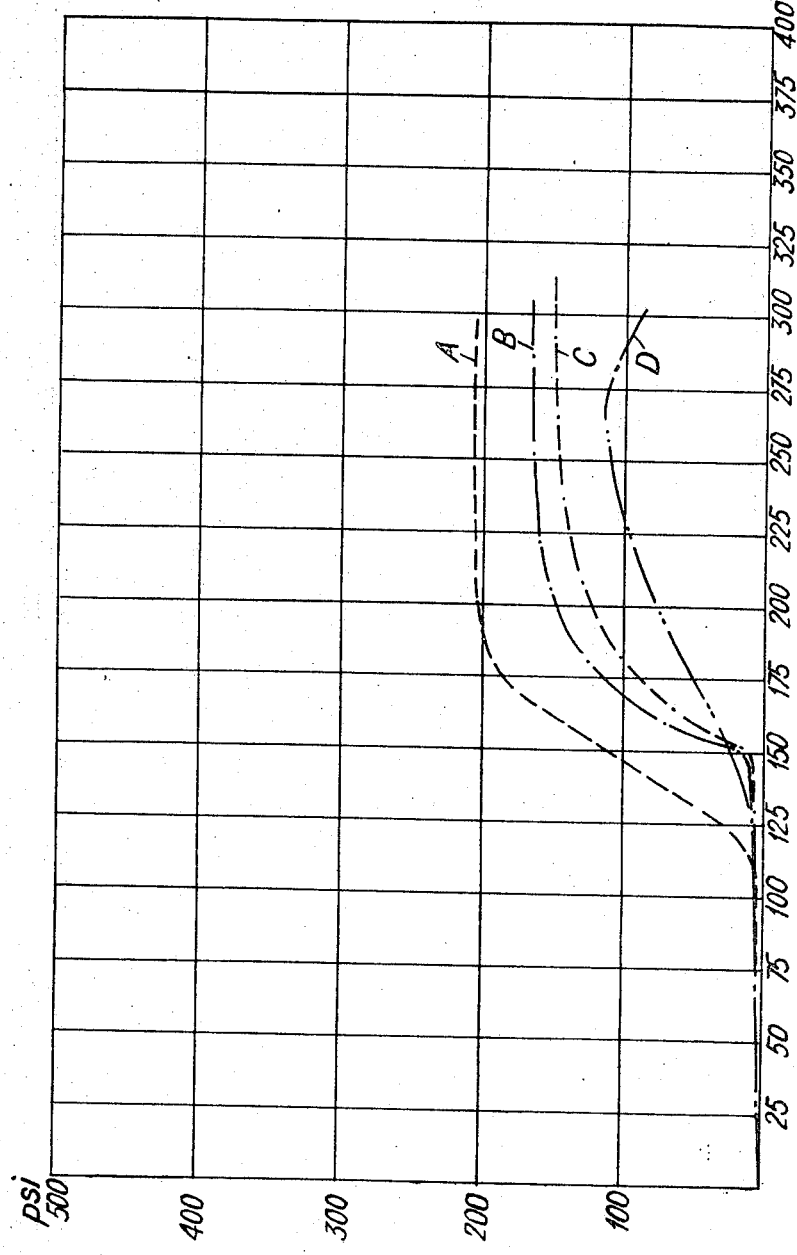

In FIG. 3 the shrink tension in the longitudinal direction (in p.s.i.).

Figure 4:
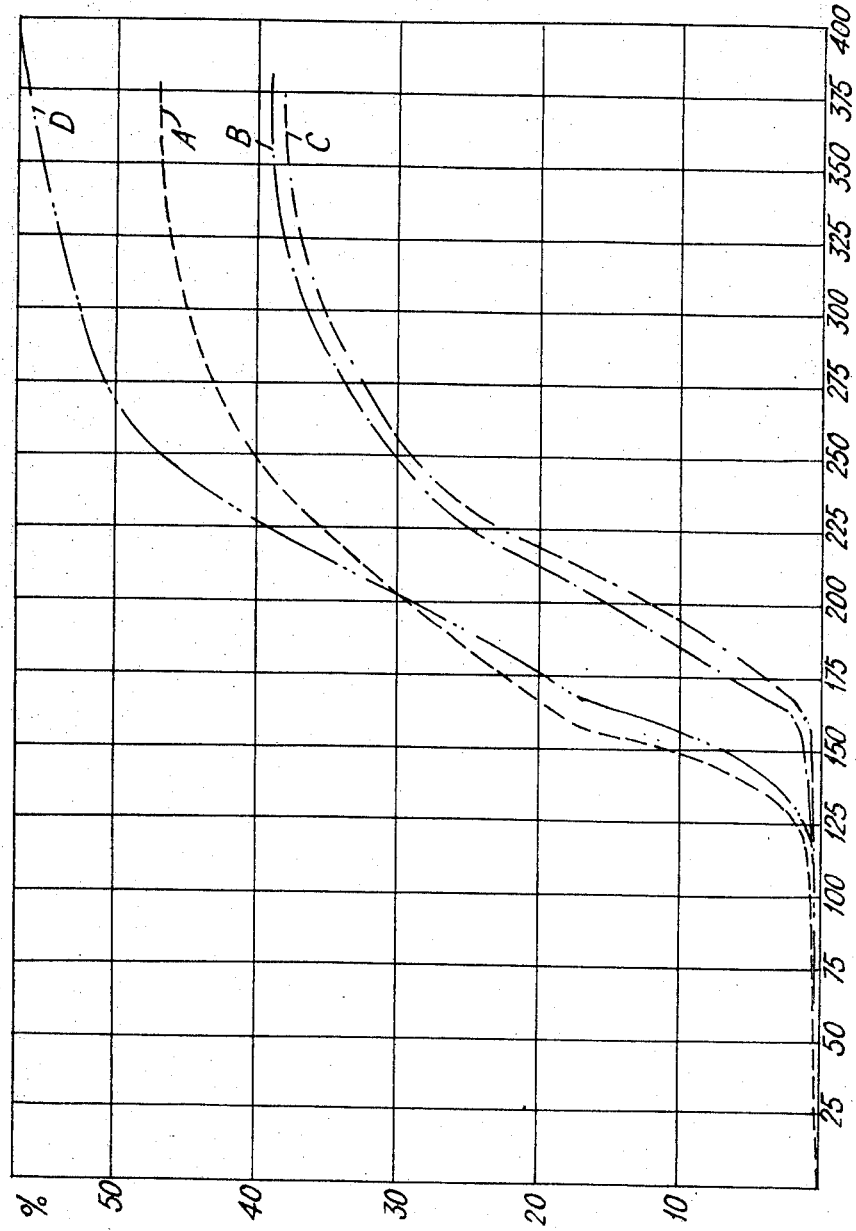

In FIG. 4 the free shrink in the transverse direction (percent).

In FIG. 5 the shrink tension in the transverse direction (in p.s.i.).

The free shrink values were determined as described above except that the film was immersed for 8 seconds in a bath of water at 135, 150, 185 or 205° F. or in a bath of mineral oil at 250° F.

For the purpose of "controlling" the shape of the bubble during the transverse orientation step, not only a frusto-conical guide but also any other suitable restraining means for shaping the bubble may be employed.

As noted above, the longitudinal orientation step because of its relatively high temperature also appears to serve as a partial annealing of the transverse shrink tension. Thus as may be seen from the table, the maximum shrink tension in the transverse direction is less than 230 p.s.i. (16.1 kg./cm.$^2$) at the highest value shown in the table and generally only about 100 p.s.i. (7 kg./cm.$^2$) rather than about 400 p.s.i. (28 kg./cm.$^2$).

We claim:

1. Process for the continuous production of a predominantly uniaxially oriented plastic film comprising:
    (a) continuously extruding the plastic through an extrusion orifice and forming a tubular film at a temperature above the orientation temperature of the plastic,
    (b) continuously drawing said tubular film away from said extrusion orifice at a longitudinal draw down rate of from 5:1 to 20:1 by subjecting the tubular film to a draw down force applied to the film in a region downstream from said extrusion orifice,
    (c) continuously maintaining said tubular film directly connected to the extrusion orifice structure,
    (d) expanding and stretching said film traversely at a blow up ratio of at least 2:1 beginning in a region closely adjacent to said extrusion orifice by a bubble of gas,
    (e) restraining the transverse expansion and stretching of said film in the region closely adjacent to said extrusion orifice to a controlled expansion configuration less than that of the natural expansion of the film at the internal pressure of operation by at least in part surrounding the tubular film with a downstream diverging generally frusto conical guide positioned closely adjacent to the extrusion orifice, the internal dimension of said frusto conical guide being larger than the external dimension of said tubular film before its expansion, said bubble of gas maintained inside of said tubular film in the region of said guide at a sufficient pressure to push said tubular film against the sides of the generally frusto conical guide,
    (f) injecting a generally frusto conical cone of upstream moving air into the converging end of said generally frusto conical guide, said generally frusto conical guide forming an outer barrier for restraining said tubular film's expansion to its internal dimension for the distance it extends along the film's processing path, said gas bubble pushing said film toward said guide and into the guide's configuration and said cone of upstream moving air forming a cushion between said film and said guide, and
    (g) adjusting the temperature of said air entering the generally frusto conical guide to bring the temperature of said tubular film to the film's orientation temperature range within the confines of the guide, thereby transversely expanding, stretching and orienting said film and longitudinally thinning said film and substantially completely neutralizing any longitudinal orientation that would bring about any longitudinal shrinking.

2. The process of claim 1 wherein longitudinal orientation that would bring about longitudinal shrinking is neutralized to a value of no more than 10% at 100° C.

3. The process of claim 2 wherein the film is subsequently longitudinally oriented for effective longitudinal shrink while retaining at least a substantial portion of its effective transverse shrink orientation by:
    (a) reheating said film, after it has been solidified, until said film reaches its orientation temperature range,
    (b) passing said film over a feed roll that maintains a substantially uniform film conveying rate and
    (c) passing said film over a draw roll downstream from said feed roll, engaging said film on the surface of said draw roll with a free gap of no more than 2 cm. from its leaving the surface of said feed roll and maintaining the linear surface speed of said draw roll higher than the linear surface speed of said feed roll.

4. A process for continuous production of a biaxially oriented film of vinyl chloride polymer comprising:
    (a) continuously extruding the vinyl chloride polymer admixed with 5 to 35% plasticizer through an extrusion orifice and forming a tubular film at a temperature above the orientation temperature of the plastic,
    (b) continuously drawing said tubular film away from said extrusion orifice at a longitudinal draw down rate of from 5:1 to 20:1 by engaging the film between two pinch rollers in a region downstream from said extrusion orifice and rotating them at a linear surface speed 5:1 to 20:1 times greater than the speed the plasticized vinyl chloride polymer exits from the extrusion orifice,
    (c) continuously maintaining said tubular film directly connected to and held at its upstream end by the extrusion orifice structure,
    (d) transversely expanding and stretching said film between (a) and (b) by surrounding the tubular film with a downstream diverging generally frusto conical guide positioned directly adjacent to and downstream from said extrusion orifice, the internal dimension of said frusto conical guide being larger than the external dimension of said tubular film before its expansion and maintaining a bubble of gas inside said tubular film in the region of said guide, said gas maintained at a sufficient pressure to push said tubular film against the sides of the generally frusto conical guide, and injecting a generally frusto conical cone of downstream moving air into the converging end of said generally frusto conical guide a small distance above said extrusion orifice, said generally frusto conical guide forming an outer barrier for restricting said tubular film's expansion for the distance it extends along the films processing path, said gas bubble pushing said film toward said guide and into the guides configuration and said cone of upstream moving air forming a cushion between said film and said guide, the blow ratio of said film being maintained at at least 2:1,
    (e) adjusting the temperature of said air entering the generally frusto conical guide to bring the temperature of said tubular film to the films orientation temperature range within the confines of the guide,
    (f) longitudinally thinning said film and substantially completely neutralizing any longitudinal orientation that would bring about longitudinal shrinking between (a) and (b),
    (g) collapsing said bubble downstream from (d) and after (e) and solidifying said film,
    (h) reheating said film after (g) until said film reaches its orientation temperature range and not above its melting temperature, (i) passing said film over a feed roll that maintains a substantially uniform film conveying rate, (j) passing said film over a draw roll downstream from said feed roll, engaging said film on the surface of said draw roll with a free gap of no more than 2 cm. from its leaving the surface of said feed roll and maintaining the linear surface speed of said draw roll higher by 1.2:1 to 2.5:1 than the linear surface speed of said feed roll, (k) adjusting the temperature of said film to a level that will result in shrinkage, (l) passing said film over a feed roll that maintains a substantially uniform film conveying rate and (m) passing said film over a receiving roll downstream from said feed roll and having a film receiving surface juxtapositioned to the film releasing surface of said feed roll, and maintaining the linear surface speed of said receiving roll lower than the linear surface speed of said feed roll and pre-shrinking said film 2% to 35% in both the transverse and longitudinal direction while restraining said film to the desired end dimensions on said rolls.

5. A process for continuous production of a biaxially oriented film of vinyl chloride polymer comprising:

(a) continuously extruding the vinyl chloride polymer admixed with 15 to 35% plasticizer through an extrusion orifice and forming a tubular film at a temperature above the orientation temperature of the plastic, (b) continuously drawing said tubular film away from said extrusion orifice at a longitudinal draw down rate of from 5:1 to 20:1 by engaging the film between two pinch rollers in a region downstream from said extrusion orifice and rotating them at a linear surface speed 5:1 to 20:1 times greater than the speed the plasticized vinyl chloride polymer exits from the extrusion orifice, (c) continuously maintaining said tubular film directly connected to and held at its upstream end by the extrusion orifice structure, (d) transversely expanding and stretching said film between (a) and (b) by surrounding the tubular film with a downstream diverging generally frusto conical guide positioned directly adjacent to and downstream from said extrusion orifice and having a diverging angle of 40 to 70°, the internal dimension of said frusto conical guide being larger than the external dimension of said tubular film before its expansion and maintaining a bubble of gas inside said tubular film in the region of said guide, said gas maintained at a sufficient pressure to push said tubular film against the sides of the generally frusto conical guide, and injecting a generally frusto conical cone of downstream moving air into the converging end of said generally frusto conical guide a small distance above said extrusion orifice, said generally frusto conical guide forming an outer barrier for restricting said tubular film's expansion for the distance it extends along the films processing path, said gas bubble pushing said film toward said guide and into the guides configuration and said cone of upstream moving air forming a cushion between said film and said guide, the blow ratio of said film being maintained at at least 2:1, (e) adjusting the temperature of said air entering the generally frusto conical guide to bring the temperature of said tubular film to the films orientation temperature range within the confines of the guide, (f) longitudinally thinning said film and substantially complete neutralizing any longitudinal orientation that would bring about longitudinal shrinking between (a) and (b), (g) collapsing said film bubble downstream from (d) and after (e) and solidifying said film, (h) reheating said film after (g) until said film reaches its orientation temperature range and not above its melting temperature, (i) passing said film over a feed roll that maintains a substantially uniform film conveying rate, (j) passing said film over a draw roll downstream from said feed roll, engaging said film on the surface of said draw roll with a free gap of no more than 2 cm. from its leaving the surface of said feed roll and maintaining the linear surface speed of said draw roll higher by 1.2:1 to 2.5:1 than the linear surface speed of said feed roll, (k) adjusting the temperature of said film to 40°–90° C., (l) passing said film over a feed roll that maintains a substantially uniform film conveying rate and (m) passing said film over a receiving roll downstream from said feed roll and having a film receiving surface juxtapositioned to the film releasing surface of said feed roll, and maintaining the linear surface speed of receiving roll lower than the linear surface speed of said feed roll and pre-shrinking said film 2% to 35% in both the transverse and longitudinal direction while restraining said film to the desired end dimensions on said rolls.

References Cited

UNITED STATES PATENTS

| 2,603,838 | 7/1952 | Lowry et al. | 264—342 |
|---|---|---|---|
| 2,955,318 | 10/1960 | Cook et al. | 264—280 |
| 2,956,855 | 10/1960 | Havens | 264—342UX |
| 2,987,767 | 6/1961 | Berry et al. | 264—95 |
| 3,243,486 | 3/1966 | Pilaro | 264—95 |
| 3,383,445 | 5/1968 | Gebler et al. | 264—95 |

ROBERT F. WHITE, Primary Examiner

J. H. SILBAUGH, Assistant Examiner

U.S. Cl. X.R.

18—14; 264—95, 210, 230, 290, 342